(12) United States Patent
Yamamoto

(10) Patent No.: US 7,329,820 B2
(45) Date of Patent: Feb. 12, 2008

(54) OPEN/CLOSED STATE DETECTING SYSTEM

(75) Inventor: Hideki Yamamoto, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 11/512,367

(22) Filed: Aug. 30, 2006

(65) Prior Publication Data
US 2007/0047009 A1  Mar. 1, 2007

(30) Foreign Application Priority Data
Aug. 30, 2005  (JP)  ............ 2005-249243

(51) Int. Cl.
*H01H 3/16* (2006.01)

(52) U.S. Cl. ............ 200/61.62; 200/61.7; 200/61.71; 200/61.73

(58) Field of Classification Search ............ 200/50.01, 200/50.1, 61.62, 61.7–61.76, 61.81, 573, 200/574, 333; 361/212–214, 220, 680
See application file for complete search history.

(56) References Cited

U.S. PATENT DOCUMENTS

| | | | | |
|---|---|---|---|---|
| 4,978,817 A | * | 12/1990 | Honda | 200/50.1 |
| 5,008,500 A | * | 4/1991 | Hamilton | 200/61.7 |
| 5,488,209 A | * | 1/1996 | Orrico et al. | 200/61.7 |
| 5,520,026 A | * | 5/1996 | Ackland | 200/61.62 |
| 5,690,206 A | * | 11/1997 | Carroll et al. | 200/61.7 |
| 5,847,343 A | * | 12/1998 | Kim | 200/61.76 |
| 6,055,394 A | | 4/2000 | Suda et al. | |
| 6,118,090 A | * | 9/2000 | Osvatic et al. | 200/61.76 |
| 7,141,750 B2 | * | 11/2006 | Yamada | 200/341 |

FOREIGN PATENT DOCUMENTS

| | | |
|---|---|---|
| JP | 2-59534 | 5/1990 |
| JP | 5342229 | 12/1993 |
| JP | 7-59984 | 3/1995 |
| JP | 8-18705 | 1/1996 |
| JP | 11-277842 | 10/1999 |

OTHER PUBLICATIONS

Japanese Office Action with English Translation, issued in Japanese Patent Application No. 2005-249243 dated Sep. 4, 2007.

* cited by examiner

*Primary Examiner*—Michael A. Friedhofer
(74) *Attorney, Agent, or Firm*—McDermott Will & Emery LLP

(57) ABSTRACT

A detecting system capable of detecting an open/closed state of a cover equipped to a body of a device is provided. The detecting system comprises a body, a cover that moves in a range between an open position and a fully-closed position, a detecting unit that detects open state and closed state of the cover, an actuating mechanism equipped to the cover, a part of which is shifted in a first direction according to opening motion and closing motion of the cover, and affects the detecting unit, and a releasing mechanism by which the part of the actuating mechanism is shifted in a second direction when the cover in the open position is brought in a position in adjacent to the fully-closed position and when the cover in the fully-closed position is opened to a predetermined extent to be in the position in adjacent to the fully-closed position.

8 Claims, 9 Drawing Sheets

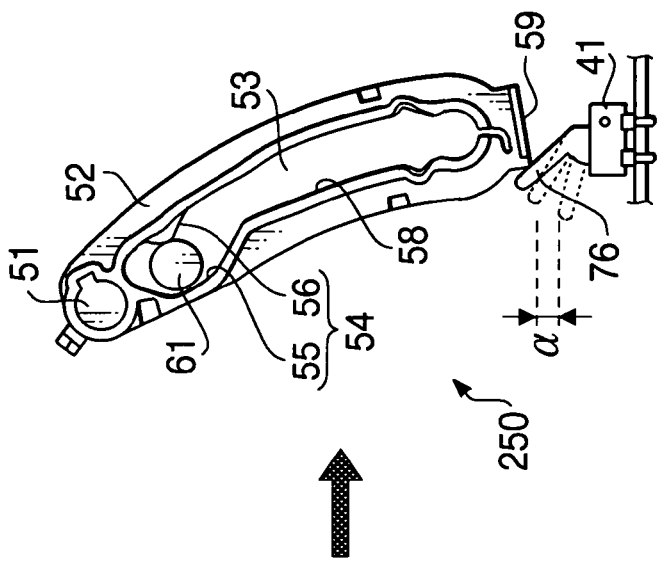
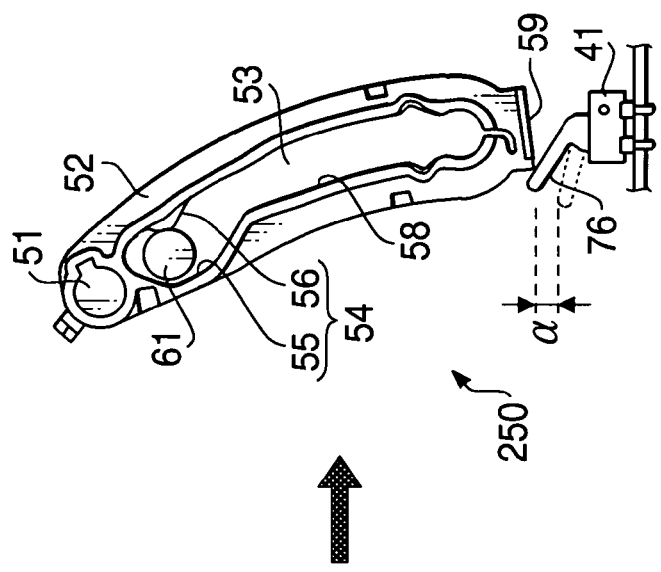
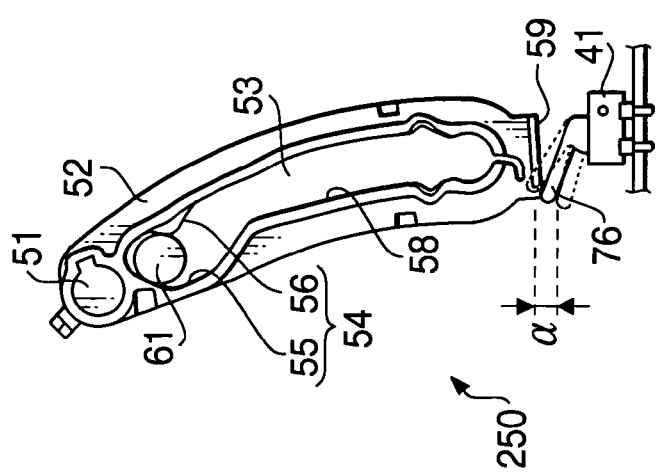

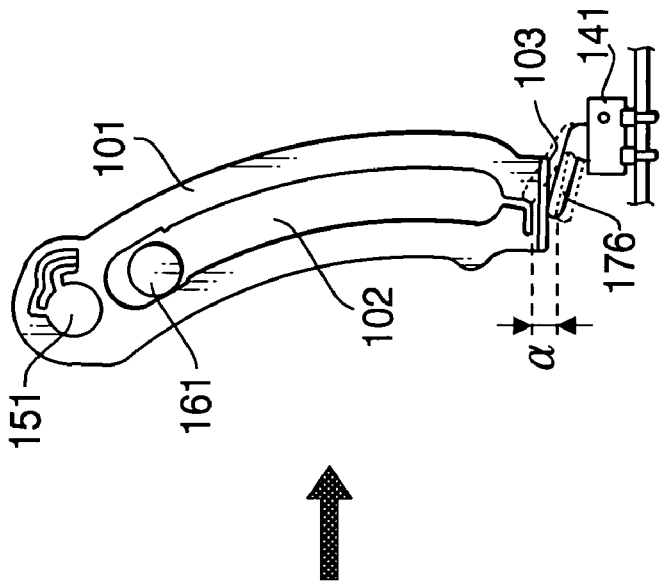
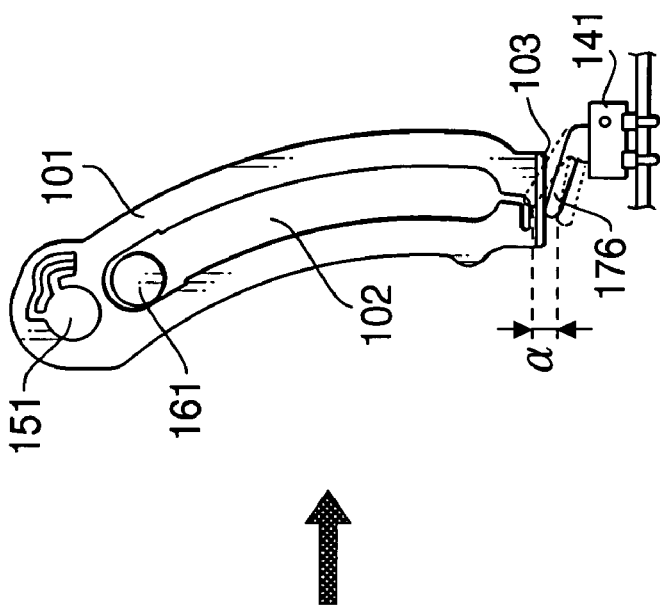
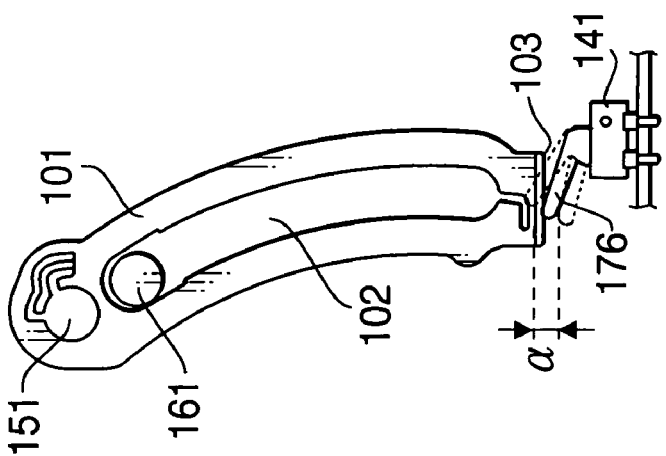

FIG.9A  UPPERMOST POSITION
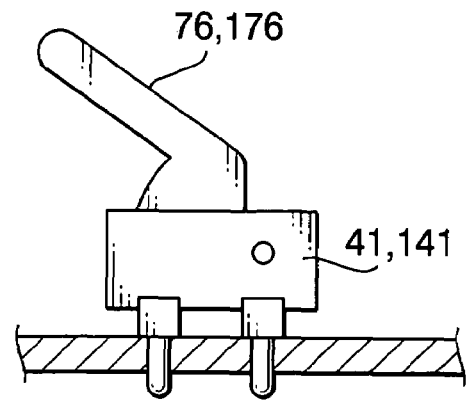
FIG.9B  LOWERMOST POSITION
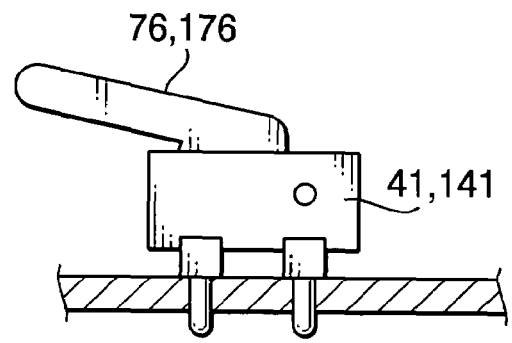
FIG.9C  UPPER LIMIT FOR ON-STATE
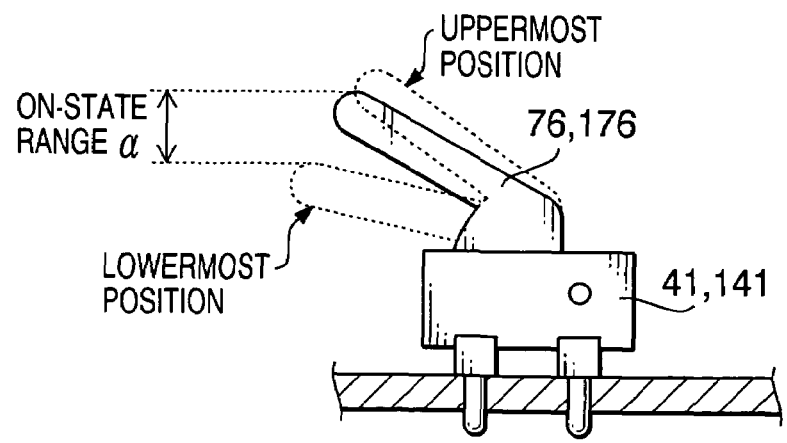

OPEN/CLOSED STATE DETECTING SYSTEM

INCORPORATION BY REFERENCE

This application claims priority from Japanese Patent Application No. 2005-249243, filed on Aug. 30, 2005, the entire subject matters of the application are incorporated herein by reference thereto.

BACKGROUND

The present invention relates to a detecting system of an open/closed state of a cover equipped to a body of a device, and to an image processing device with the detecting system.

Conventionally, a device such as a facsimile machine having a body and a cover thereof is often provided with a functionality to detect an open/close status of the cover as the cover is configured to be openable and closable. In such a facsimile device, various operations such as scanning an original document and recording an image onto a recording sheet are conducted when the status of the cover is detected and the cover being closed is determined.

For detecting the open/close status of the cover, a switch may be provided inside a body case so that the switch is operated (for example pressed or contacted) by the cover itself or by a component of the same device as the cover is closed (see Japanese Patent Provisional Publication No. HEI8-18705, for example). That is, the open/close status of the cover can be detected as the switch is turned on and off as the cover is closed and opened.

An example of a configuration of a detecting system capable of detecting the open/close status of such a cover for a conventional facsimile machine is shown in FIGS. 7 and 8. FIGS. 7 and 8 show a side view of a facsimile machine 100 with a detecting system comprising a cover open/close sensor 141 and an actuator 101, which will be described hereinafter. A cover 203 shown in FIG. 7 is in a fully-closed position, whilst the cover 203 shown in FIG. 8 is opened (uplifted) as the cover 203 is rotated about a rotary shaft 105 at a predetermined angle (for example 6 degrees).

In the facsimile machine 100, the cover 203 is adapted to be openable and closable to a body case 202. As the cover 203 is opened, the cover 203 is rotated about the rotary shaft 105 in a counter-clockwise direction in FIGS. 7 and 8.

The detecting system of the facsimile machine 100 comprises a cover-side shaft 151, which is fixedly connected to the cover 203, and an actuator 101, through which the cover-side shaft 151 is penetrated at one end so that the cover-side shaft 151 can be rotated about the cover-side shaft 151. The detecting system further comprises a case-side shaft 161, which is fixedly connected to the body case 202, and a cover open/close sensor 141, which is turned on and off by a contact surface 103 formed at a lower portion of the actuator 101. The cover open/close sensor 141 is fixedly arranged on a printed circuit board 140.

The cover open/close sensor 141 is provided with a rotatable lever 176, which can be rotated about an axis 175. The rotatable lever 176 rotates about the axis 175 downwardly as the rotatable lever 176 is pressed by the contact surface 103, and resiliently recovers to the original position when the pressure from the contact surface 103 is removed. FIGS. 9A through 9C show a relation between positions of the rotatable lever 176 and an on/off state of the cover open/close sensor 141.

As shown in FIG. 9A, an upper end portion of the rotatable lever 176 is positioned uppermost when no pressing force is applied to the rotatable lever 176. In this position, the cover open/close sensor 141 is in an off-state. When the rotatable lever 176 is pressed downward, the rotatable lever 176 is rotated and shifted downward accordingly. The rotatable lever 176 can be shifted down to a lowermost position shown in FIG. 9B, wherein the cover open/close sensor 141 is turned on. As the rotatable lever 176 is being pressed continuously and reaches to a position shown in FIG. 9C (an upper limit for on-state), the cover open/close sensor 141 is switched on. That is, the cover open/close sensor 141 is turned on when the rotatable lever 141 is in a range from the upper limit and the lowermost position (an on-state range $\alpha$).

As shown in FIGS. 7 and 8, the actuator 101 is an arc-shaped elongated plate, wherein a guide hole 102 is formed along curvature of the actuator 101. The case-side shaft 61 is penetrated through the actuator 101 and guided in the guide hole 102.

In the facsimile machine 100 configured as above, when the cover 203 is opened, the cover-side shaft 151, which is connected to the cover 203, is rotated about a rotation axis 105 of the cover 203 along with the cover 203, and the actuator 101 is uplifted along with the cover 203 as well.

The case-side shaft 161, which is fixed to the body case 102, stays steady even when the actuator 101 is uplifted. Therefore, the case-side shaft 161 is guided relatively downward in the guide hole 102 as the actuator 101 is uplifted along with the cover 203.

When the cover 203 is fully closed as shown in FIG. 7, the rotatable lever 176 of the cover open/close sensor 141 is pressed by the contact surface 103 of the actuator 101 and shifted down to a position in the on-state range $\alpha$.

As the cover 203 is opened and uplifted from the fully-closed position, the contact surface 103 of the actuator 101 is uplifted accordingly as well as the rotatable lever 176 of the cover open/close sensor 141. When the cover 103 is uplifted to a position shown in FIG. 8, which is beyond the upper limit for the on-state shown in FIG. 9C, the cover open/close sensor 141 is turned off.

Thus, in the conventional facsimile machine 100, the open/close status of the cover 203 is detected as the actuator 101 is shifted upward and downward in accordance with the open/close motions of the cover 203.

In the configuration as described above, the positional relation between the contact surface 103 and the rotatable lever 176 of the cover open/close sensor 141 should be constant among a plurality of the facsimile machines 100 of a product line, although the positional relation practically varies among the individual facsimile machines 100 due to various factors such as dimension errors and the like.

As the positional relation of the contact surface 103 and the rotatable lever 176 varies, there may be a case wherein the rotatable lever 176 is pressed substantially downward to switch on the cover open/close sensor 141 (for example in a position in vicinity to the lowermost position of the rotatable lever 176 shown in FIG. 9B) when the cover 203 is closed, whilst there may be another case wherein the rotatable lever 176 is pressed but insufficiently to switch on the cover open/close sensor 141 (for example in a position in vicinity to the upper limit for the on-state shown in FIG. 9C).

In order to compensate the variation, the on-state range $\alpha$ is configured to be wide enough so that the cover open/close sensor 141 can be reliably switched on when the cover 203 is closed regardless of the variation among the individual facsimile machines 100.

With the above configuration, however, the on-state of the cover 203 may not be detected unless the cover 203 is substantially widely opened, and the switch of the cover open/close sensor 141 may not be turned off depending on the variation.

When the facsimile machine 100 is configured to have the rotatable lever 176 that can be pressed down to a position in vicinity to the lowermost position as the cover 203 is closed, the cover 203 is required to be opened widely enough to release the cover open/close switch 41 until the rotatable lever 176 is uplifted above the upper limit for the on-state. In other words, the cover open/close sensor 141 may be turned on even when the cover 203 is being closed but is not fully closed.

In such a case, a user of the facsimile machine 100 may erroneously judge that the cover 203 is fully closed and may attempt to start a scanning operation of an original document with the cover 203 open, although the facsimile machine 100 may not operate correctly and an error such as a feeding error of the original document may occur.

SUMMARY

In view of the foregoing drawbacks, aspects of the present invention are advantageous in that a detecting system wherein an open/close state of a cover can be detected when the cover is open even slightly is provided. Further, an image forming apparatus having such a detecting system is provided.

BRIEF DESCRIPTION OF THE ACCOMPANYING DRAWINGS

FIGS. 4A-4C are schematic diagrams showing a mechanism of a cover open/close sensor according to the embodiment of the present invention.

FIGS. 5A-5C are schematic diagrams showing a conventional mechanism of a cover open/close sensor.

FIGS. 9A-9C are schematic diagrams showing mechanisms of a rotatable lever of a cover open/close sensor.

DETAILED DESCRIPTION

General Overview

Figure 1:
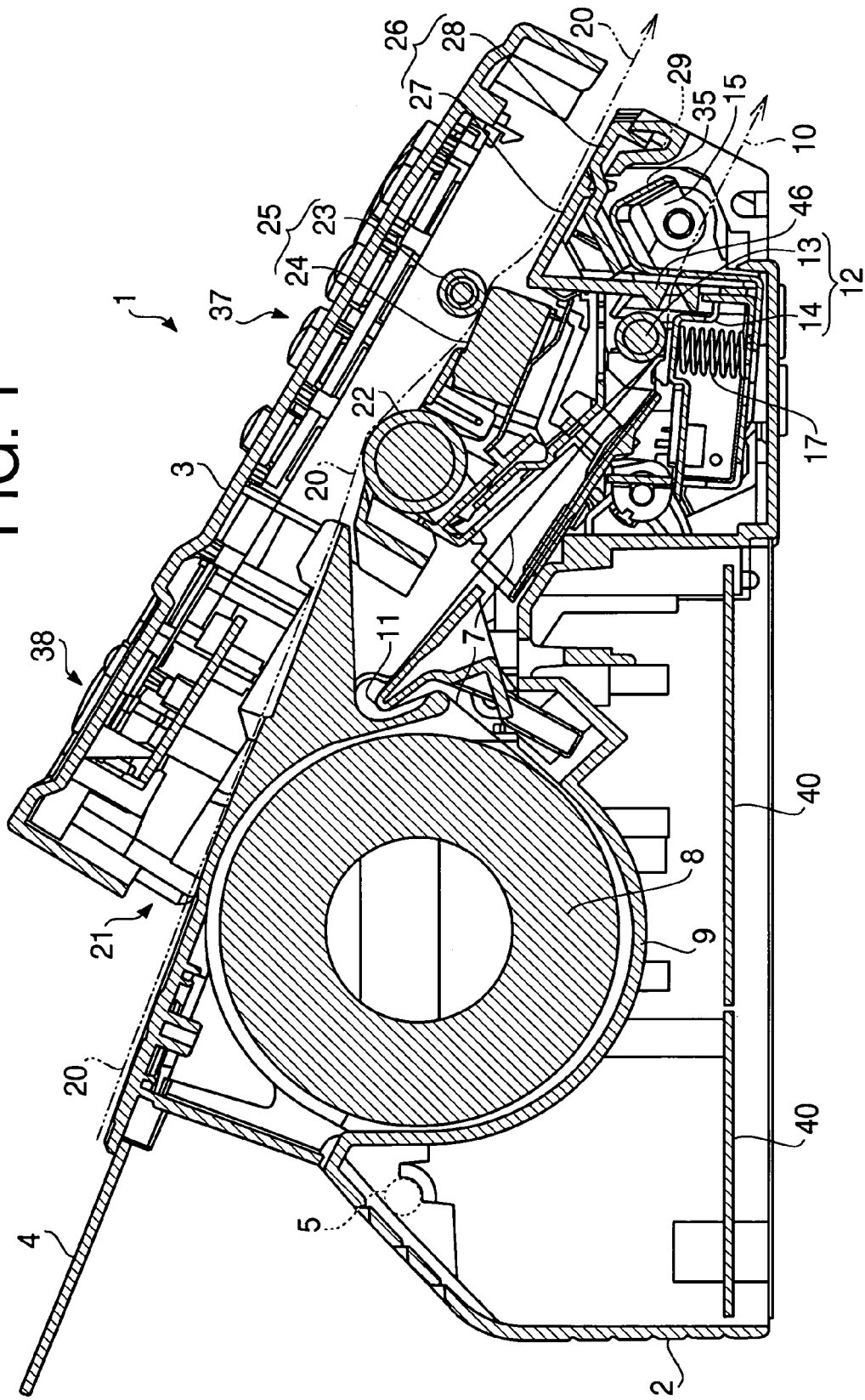
FIG. 1 is a cross-sectional side view showing an overall composition of a facsimile machine according to an embodiment of the present invention.

The following describes general aspects of the invention that may or may not be comprised in various embodiments and modifications. It should be noted that various connections are set forth between elements in the following description. These connections, in general and, unless specified otherwise, may be direct or indirect and this specification is not intended to be limiting in this respect.

According to some aspects of the invention, there is provided a detecting system capable of detecting an open/closed state of a cover equipped to a body of a device. The detecting system comprises a body, a cover that is openable and closable to the body by moving in a range between an open position and a fully-closed position, a detecting unit that is equipped to the body and detects open state and closed state of the cover, an actuating mechanism that is equipped to the cover and a part of which is shifted in a first direction to affect the detecting unit according to opening motion and closing motion of the cover, and affects the detecting unit so that the closed state of the cover is detected by the detecting unit when the detecting unit is interfered with the actuating mechanism in a predetermined extent, and a releasing mechanism by which the part of the actuating mechanism is shifted in a second direction, in which the detecting system is released from an interfering effect caused by the interference with the actuating mechanism when the cover in the open position is brought in a position in adjacent to the fully-closed position and when the cover in the fully-closed position is opened to a predetermined extent to be in the position in adjacent to the fully-closed position.

According to the detecting system as described above, when the cover in the fully-closed position is opened to the predetermined extent, the actuating mechanism is shifted in the second direction that is different from the first direction, unlike the conventional detecting system in which an actuating mechanism is simply shifted in one direction to affect the detecting unit. In other words, the detecting unit is not simply released from the effect of the actuating mechanism, but the detecting unit is released from the effect of the actuating mechanism in a shorter period as the actuating mechanism is shifted in the second direction.

The predetermined extent at which the cover is required to be opened to shift the actuating mechanism in the second direction can be determined based on required detecting accuracy of the open/closed state of the cover. For example, if the cover being opened to a small extent should be detected as the open state, the predetermined extent can be configured to be small so that the actuating mechanism is shifted in the second direction when the cover is opened to the small extent. It should be noted that the cover being opened to an extent which is greater than the predetermined extent should be detected to be open at all time.

Thus, the open state of the cover being opened to a slight extent can be detected according to the detecting system of the present invention. In other words, as the cover being open is closed, the actuating mechanism does not affect the detecting unit until immediately before the cover is in the fully-closed position, but the cover comes in a position wherein the opening is a substantially small extent (i.e., when the cover is opened to a less extent than the predetermined extent), the effect of the releasing mechanism to the detecting unit is removed so that the actuating mechanism can affect the detecting unit. Thus, the cover being incompletely closed can be prevented from being erroneously determined to be open by the detecting unit.

Optionally, the actuating mechanism may comprise a first shaft that is provided to the cover and is extended perpendicularly with respect to an opening/closing direction of the cover, a second shaft that is provided to the body and is extended in parallel with respect to an axis of the first shaft, an actuator that is formed to comprise a through hole to be penetrated through by the first shaft and a guide hole to be engaged with the second shaft. The second shaft may be shifted along the guide hole with respect to the actuator according to the opening motion and the closing motion of the cover so that the actuator is shifted in the first direction. The releasing mechanism may be configured to shift at least an actuating portion of the actuator in the second direction when the cover in the fully-closed position is opened to the predetermined extent.

According to the detecting system configured as above, the actuator is rotated by the releasing mechanism as the cover is opened to the predetermined extent. By the rotation of the actuator, at least the actuating portion of the actuator is shifted in the second direction. Thus, the effect of the actuating mechanism to the detecting unit is removed. Thus, the cover being incompletely closed can be prevented from being erroneously determined to be open by the detecting unit.

It should be noted that, when the actuator is formed to comprise the guide hole, the guide hole may be configured so as to cause the actuator to be shifted in the second direction.

Optionally, the guide hole may comprise a guide portion in which the actuator is shifted in the open/close direction of the cover according to the opening motion and the closing motion of the cover. The releasing mechanism may comprise a releasing portion, which is provided in a portion being in a direction wherein the second shaft is relatively shifted according to the opening motion of the cover, adjacent to a position wherein the second shaft is located when the cover is in the fully-closed position, so that the actuating portion is shifted in the second direction by an effect of the second shaft that occurs when the cover is opened to the predetermined extent.

According to the configuration described above, when the cover in the fully-closed position is opened, the actuator is shifted in the direction of the opening direction of the cover. As the guide hole formed in the actuator is engaged with the second shaft provided to the body, the second shaft is relatively shifted in the guide hole when the cover is opened.

However, when the guide hole is configured merely with the guide portion, the actuator is directly shifted in the opening direction of the cover along with the opening motion of the cover, and the actuating portion is drawn away from the detecting unit in the first direction. According to the configuration of the actuator as described above, the guide hole is provided with the releasing portion so that the actuator is affected by the second shaft as the cover is opened to the predetermined extent. Thus, as the releasing portion in the actuator that is rotatable about the first shaft is affected by the second shaft provided to the body, the actuator is shifted in the second direction so that the effect of the actuating mechanism to the detecting system is removed and the cover in the open state is detected.

With the detecting system described above, the actuator capable of being shifted in the second direction by the effect of the second shaft to the releasing portion as the cover is opened can be achieved in a less complicated configuration.

Optionally, the detecting unit may comprise a pressed portion, which is pressed by the actuator in the first direction, and a sensor unit, which detects the closed state of the cover when the pressed portion is shifted for a predetermined sensing amount by the actuating mechanism. The pressed portion being pressed by the actuator may be released from the effect of the actuator within a less amount to be pressed than the predetermined sensing amount in which the pressed portion is released from an effect of an actuating mechanism having no releasing mechanism as the cover in the fully-closed position is opened.

According to the detecting system as described above, when the cover in the fully-closed position is opened to the predetermined extent, the actuating portion is shifted according to the rotation of the actuator so that the amount to be pressed within which the pressed portion is released from the effect of the actuator can be configured to be smaller than the predetermined sensing amount. Thus, the open state of the cover can be detected when the cover 3 is opened merely at a small extent.

It should be noted that in order to release the detecting unit from the effect of the actuator in a prompt manner, the actuating portion should be shifted in the second direction.

Optionally, the releasing mechanism may shift the actuator in a direction perpendicular to the first direction whilst the cover in the fully-closed position is opened to the predetermined extent.

According to the above configuration, the effect of the actuator to the detecting unit can be removed in a faster manner, so that the cover being open at a minor extent can be reliably detected.

According to another aspects of the invention, there is provided an image processing apparatus. The image processing apparatus comprises a detecting system comprising a body, a cover that is openable and closable to the body by moving in a range between an open position and a fully-closed position, a detecting unit that is equipped to the body and detects one of open state and closed state of the cover, an actuating mechanism that is equipped to the cover and a part of which is shifted in a first direction to affect the detecting unit according to opening motion and closing motion of the cover, and affects the detecting unit so that the closed state of the cover is detected by the detecting unit when the detecting unit is interfered with the actuating mechanism in a predetermined extent, and a releasing mechanism by which the part of the actuating mechanism is shifted in a second direction, in which the detecting system is released from an interfering effect caused by the interference with the actuating mechanism when the cover in the open position is brought in a position in adjacent to the fully-closed position and when the cover in the fully-closed position is opened to a predetermined extent to be in the position in adjacent to the fully-closed position. The image processing apparatus further comprises a scanning unit to scan an image of an original document, an output unit to output a content of the image scanned by the scanning unit to an external environment, an input unit to input an image data from the external environment, and an image recording unit to record an image based on the image data inputted by the input unit on a recording medium. The scanning unit, the output unit, the input unit, and the image recording unit are stored in the body.

According to another aspects of the invention, there is provided an imaging apparatus. The imaging apparatus comprises a body, a cover that is openable and closable to the body by moving in a range between an open position and a fully-closed position, a detecting system capable of detecting an open/closed state of the cover, comprising a detecting unit that is equipped to the body and detects open state and closed state of the cover, an actuating mechanism that is equipped to the cover and a part of which is shifted in a first direction to affect the detecting unit according to opening motion and closing motion of the cover, and affects the detecting unit so that the closed state of the cover is detected by the detecting unit when the detecting unit is interfered with the actuating mechanism in a predetermined extent, and a releasing mechanism by which the part of the actuating mechanism is shifted in a second direction, in which the detecting system is released from an interfering effect caused by the interference with the actuating mechanism when the cover in the open position is brought in a position in adjacent to the fully-closed position and when the cover in the fully-closed position is opened to a predetermined extent to be in the position in adjacent to the fully-closed position.

According to the above configuration, a user of the image processing apparatus and the imaging apparatus can be notified of the cover being open even when the opening extent is small. Therefore, the can be prevented from attempting to start a scanning operation of the original document with the cover being open, so that the image processing apparatus and the imaging apparatus may not be operated incorrectly.

EMBODIMENT

Referring now to the drawings, a description will be given in detail of an embodiment in accordance with the present invention.

First, an overall configuration of a facsimile machine 1 will be described. FIG. 1 is a cross-sectional side view showing the overall composition of the facsimile machine 1 according to an embodiment of the present invention. The facsimile machine 1 is provided with a cover 3 that covers a body case 2. The cover 3 is adapted to be openable and closable to a body case 2. In FIG. 1, a front of the facsimile machine 1 is shown on the right-hand side and a rear is shown on the left-hand side. Further, a sheet tray 4 is provided to an upper-rear part of the cover 3.

The body case 2 and the cover 3 are linked with a cover rotation shaft 5 (at rear ends of the body case 2 and the cover 3) to be rotatable around the cover rotation shaft 5. When a user of the facsimile machine 1 opens the cover 3 by operating a lever (not shown), the cover 3 rotates in a counterclockwise direction in FIG. 1 around the cover rotation shaft 5, by which various components mounted on an upper part of the facsimile machine 1 (the sheet tray 4 and a display panel 38, for example) also rotate about the cover rotation shaft 5 together with the cover 3.

The body case 2 is provided with a hemi-cylindrical roll tray 9 at the rear part thereof, and a sheet roll 8, around which a sheet of thermo-sensitive recording paper 7 is rolled, is stored in the roll tray 9. The recording paper 7 pulled out of the roll tray 9 is carried to an image recording unit 12 via a regulating unit 11. After an image is formed between a recording-side platen roller 13 and a thermal head 14 in the image recording unit 12, the recording paper 7 is carried along a sheet discharge path 10, cut in a predetermined length by a cutting member 15, and discharged out (in front) of the facsimile machine 1.

The recording paper 7 is formed to have a width that covers a whole printable range of the thermal head 14, which comprises a plurality of heating elements arranged in line. The regulating unit 11 is provided at a downstream side of a sheet feeding path of the recording paper 7 with respect to the sheet roll 8 so that curl of the rolled recording paper 7 can be removed when the recording paper 7 is carried along the regulating unit 11.

On the downstream side of the regulating unit 11 in the sheet feed path, the image recording unit 12 having the recording-side platen roller 13 and the thermal head 14 is provided. The recording-side platen roller 13 is driven and rotated by drive motor 9 (which will be described later) and gears (not shown), so that the recording paper 7 is carried forward and discharged out of the facsimile machine 1.

The thermal head 14, designed as a so-called line thermal head with a plurality of heating elements arranged in line, by which a desired image (for example, an image received over a telephone line) is recorded on the recording paper 7. The thermal head 14 is pressed against a lower circumferential surface of the recording-side platen roller 13 by a spring 17.

On a downstream side of the image recording unit 12, a cutter unit 15, which is covered by a cutter cover 35 is provided. The recording paper 7 to be discharged out of the facsimile machine 1 is cut in a predetermined length by the cutter unit 15. In the facsimile machine 1 of the present embodiment, a part of the recording paper 7 whereon the image is formed is cut by the cutter unit 15 as an image recording process is completed.

Meanwhile, when an original document (not shown) to be transmitted by the facsimile machine 1 is inserted into a document inlet 21, the original document is carried along a document feed path 20 by an ADF (automatic document feeder) roller 22 and a scanner-side platen roller 23. Specifically, the original document inserted into the document inlet 21 is first carried by the ADF roller 22 to a scanner unit 25. Over the ADF roller 22, a separating member 31 (see FIG. 2) is provided to make slight contact with a top of the ADF roller 21. The separating member 31 prevents multi feed of the original document being carried by the ADF roller 22, by successively separating a lowermost sheet of the original document from a stack of sheets of the document. Therefore, the original document inserted into the document inlet 21 is fed sheet by sheet along the document feed path 20 by the ADF roller 21 in cooperation with the separating member 31.

On the downstream side of the ADF roller 21 in the document feed path 20, a CIS (contact image scanner) 24 is provided. Over the CIS 24, the scanner-side platen roller 23 is provided so as to press against a top circumferential surface of the CIS 24. The CIS 24 successively reads an image on each sheet of the original document whilst the sheet carried along the document feed path 20 passes between the CIS 24 and the scanner-side platen roller 23. The image read by the CIS 24 is output via a transmission unit 92, which will be described hereinbelow.

On the downstream side of the scanner unit 25, a document path 26 is provided so that the original document that has been scanned by the CIS 24 can be securely carried and discharged from the facsimile machine 1 there along.

The document path 26 is configured with an openable cover and a fixed cover 28. The openable cover 27 is provided so that the image recording unit 12 and the cutter unit 15 can be covered thereby. As the openable cover 27 is opened and closed, the openable cover 27 is rotated about an axis 29.

At one end of the openable cover 27 (at the downstream side of the recording-side platen roller 13) is provided a paper guide 46, by which the recording paper 7 with the image formed thereon is guided to the outside of the facsimile machine 1 along the sheet discharge path 10.

An operation panel 37 comprising numeric keys and various function keys is provided on top of the cover 3. The user can instruct the facsimile machine 1 to perform various operations by pressing the keys on the operation panel 37. Further, a display panel 38 having a display unit such as an LCD (liquid crystal display) is provided so that various information such as operating status of the facsimile machine 1 and transmission status of the image can be shown on the display panel for the user to view.

Further, a printed circuit board 40 with an electronic circuit, which controls the operations of the facsimile machine 1, is provided underneath the roll tray 9 in side the body case 2.

Figure 2:
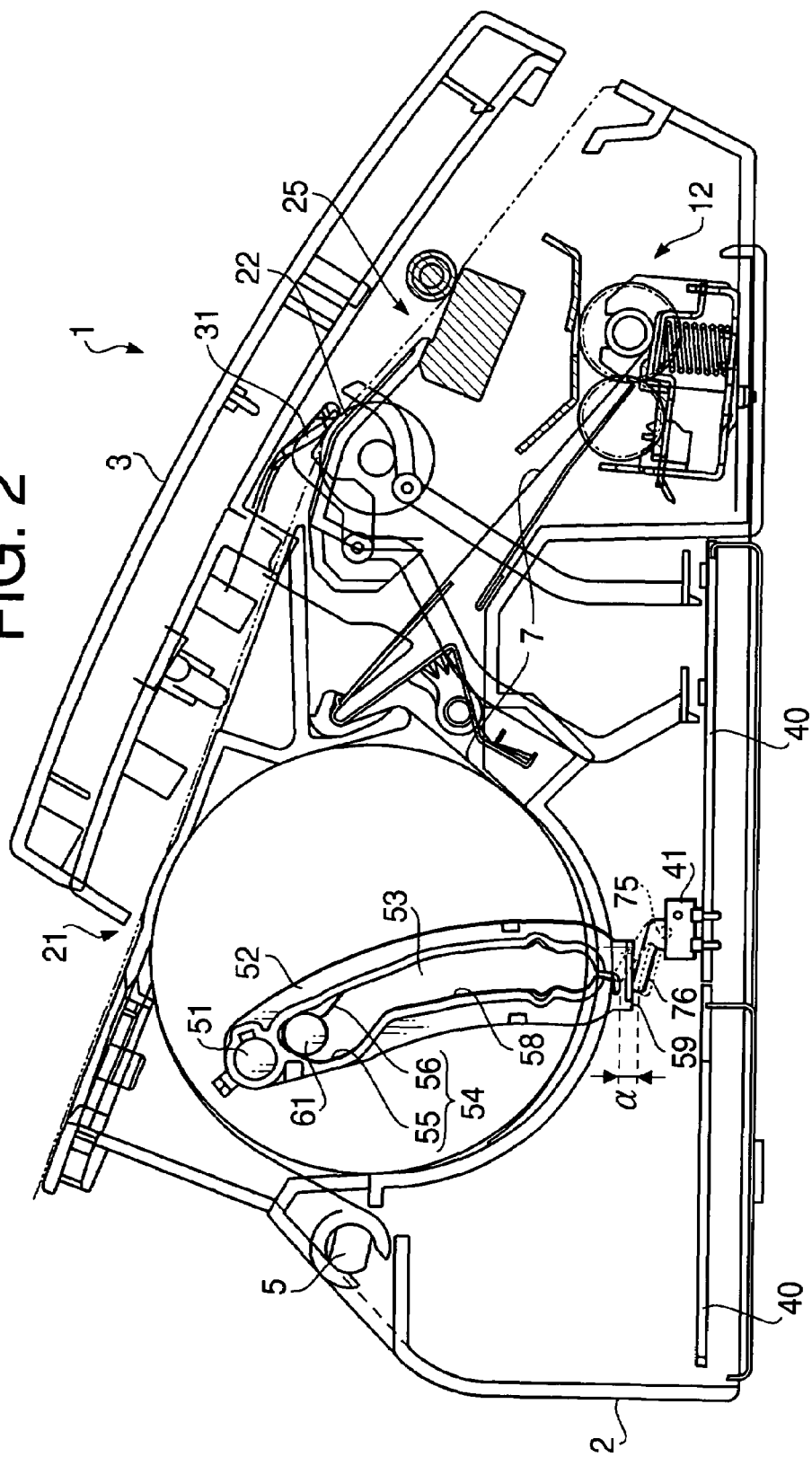
FIG. 2 is a schematic diagram showing a detecting system to detect open/close status of a cover of the facsimile machine according to the embodiment of the present invention.
Figure 3:
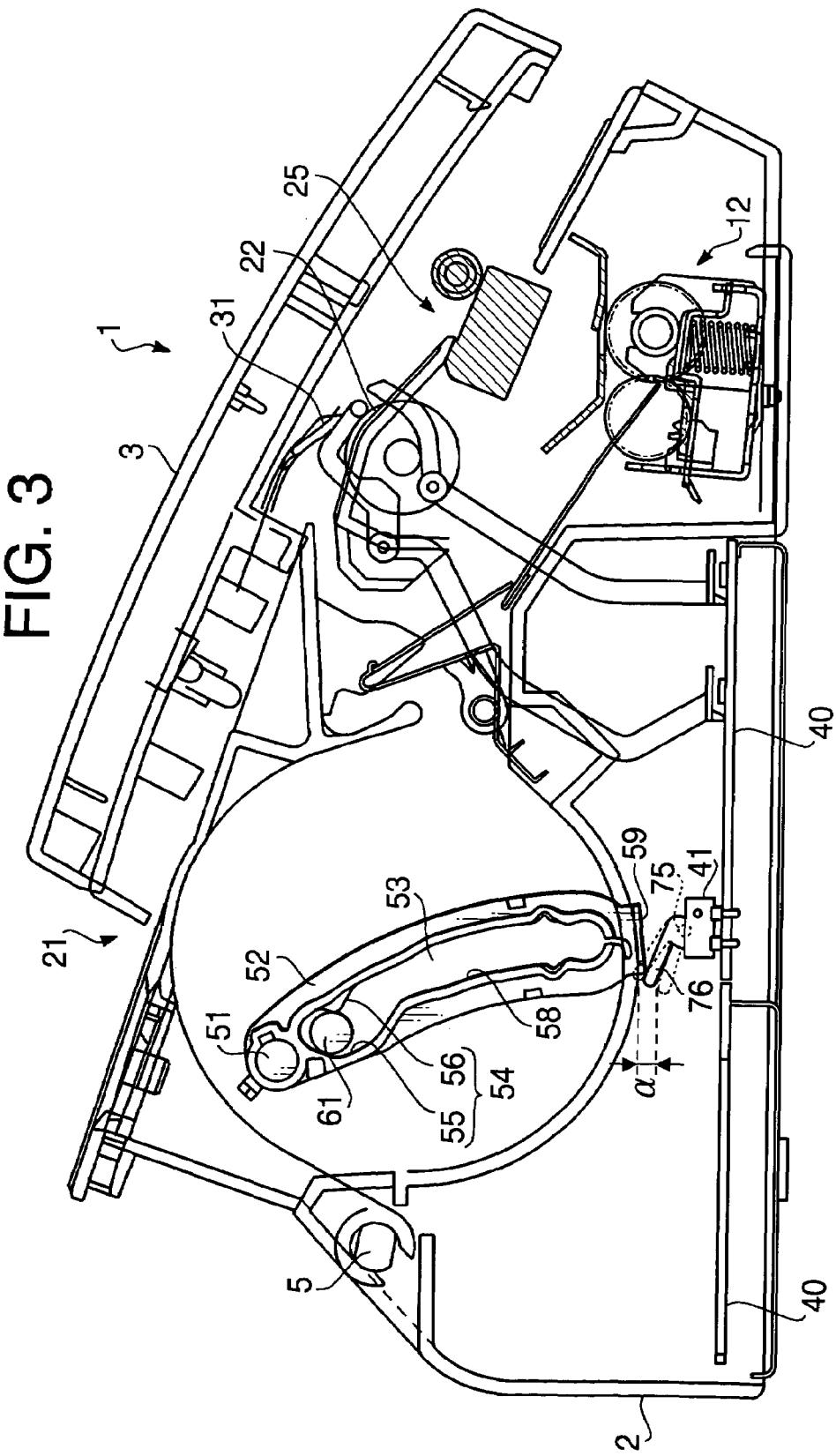
FIG. 3 is another schematic diagram showing the detecting system to detect open/close status of the cover of the facsimile machine according to the embodiment of the present invention.

Next, referring to FIGS. 2 and 3, a functionality of an open/close sensor of the cover 3 of the facsimile machine 1 will be described. FIGS. 2 and 3 are schematic diagrams showing a detecting system capable of detecting open/close status of the cover 3 of the facsimile machine 1 according to the embodiment of the present invention. The cover 3 shown in FIG. 2 is in a fully-closed position, whilst the cover 3 shown in FIG. 3 is in an open position and opened (uplifted) as the cover 3 is rotated about the rotary shaft 5 at a predetermined angle (for example 1.5 degrees). The open position of the cover 3 is in a rage between the fully-closed position and a fully-opened position wherein the cover 3 is opened at a maximum extent thereof (not shown).

As shown in FIGS. 2 and 3, the facsimile machine 1 is provided with a detecting system 250 capable of detecting open/close status of the cover 3. More specifically, the detecting system 250 comprises a cover-side shaft 51, which is fixedly connected to the cover 3, an actuator 52, through which the cover-side shaft 51 is penetrated at one end so that the cover-side shaft 51 can be rotated about the cover-side shaft 51. The detecting system 250 further comprises a case-side shaft 61, which is fixedly connected to the body case 2, and a cover open/close sensor 41 with a rotatable lever 76, which is turned on and off by a contact surface 59 formed at a lower portion of the actuator 52.

It should be noted that the cover-side shaft 51, the case-side shaft 61, and the cover open/close sensor 41 are configured similarly to the cover-side shaft 151, the case-side shaft 161, and the cover open/close sensor 141 of the conventional facsimile machine 100 described above. Therefore, the rotatable lever 76 of the cover open/close sensor 41 is adapted to be rotated in a range from the uppermost position shown in FIG. 9A to the lowermost position shown in FIG. 9B. Whilst the rotatable lever 76 can be shifted upward and downward (i.e., in a direction perpendicular to a plane of the printed circuit board 40), the cover open/close sensor 41 is turned on when the rotatable lever 76 is in the on-state range $\alpha$.

When the rotatable lever 76 is outside the on-state range $\alpha$, i.e., above the upper limit for the on-state, the cover open/close sensor 41 is switched off, and the cover 3 being open is detected. As the rotatable lever 76 is shifted (pressed) from the uppermost position to the lowermost position for a predetermined length, the rotatable lever 76 reaches to the upper limit for the on-state, and thus the cover open/close sensor 41 is switched on.

It should be noted that the facsimile machine 1 of the present embodiment can be distinguished from the conventional facsimile machine 100 in a configuration of the actuator 52. As shown in FIGS. 2 and 3, the actuator 52 is an arc-shaped elongated plate, which comprises a guide hole 53 formed along curvature of the actuator 52. The case-side shaft 61 is penetrated through the actuator 52 and guided in the guide hole 53. In the facsimile machine 1 configured as above, when the cover 3 is opened and closed, the case-side shaft 61 is shifted along the guide hole 53 with respect to the actuator 52.

The guide hole 53 comprises a main guide portion 58 and a release portion 54. When the case-side shaft 61 is in the main guide portion 58 as the cover 3 is opened and closed, the actuator 52 is shifted in a direction corresponding to the opening/closing motion of the cover 3. When the case-side shaft 61 is in the release portion 54 as the cover 3 being closed is opened to a predetermined extent, the actuator 52 is rotated so that the contact surface 59 is shifted forward (a right-hand side of FIG. 2). The release portion 54 comprises a concave part 55 and a convex part 56, which are formed at an upper portion (a portion closer to the cover-side shaft 51) of the guide hole 53.

When the cover 3 is fully closed, as shown in FIG. 2, the case-side shaft 61 is located at an upper end of the guide hole 53 adjacently to the release portion 54. As the cover 3 is opened, the actuator 52 is uplifted accordingly, and the case-side shaft 61 is shifted relatively downward of the guide hole 53.

In this state, as the contact surface 59 of the actuator 52 is uplifted, pressing force to press the rotatable lever 76 of the cover open/close sensor 41 decreases. Thus, the rotatable lever 76, which is in the on-state range $\alpha$, is uplifted.

Accordingly, the case-side shaft 61 becomes in contact with the convex part 56, and the actuator 52 is rotated about the cover-side shaft 51 by an effect of the contact in a counterclockwise direction in FIG. 2. With this rotating force, a direction of the shift of the contact surface 59 is changed from upwardly to forwardly (to the right-hand side in FIG. 3).

As the cover 3 is opened further at a predetermined extent, the contact surface 59 is further shifted forwardly. Thus, the rotatable lever 76 is further uplifted to be located in a position above the on-state range $\alpha$, and the cover open/close sensor 41 is turned off.

With this configuration in the facsimile machine 1 of the present embodiment, the direction of the contact surface 59 being shifted is changed as the cover 3 is opened to a predetermined extent so that the cover open/close sensor 41 is turned off. Therefore, the cover open/close sensor 41 can be turned off even when the cover 3 is opened to a small extent so that the open/close status of the cover 3 can be reliably detected.

When the cover 3 is in an open state with the case-side shaft 61 being in the main guide portion 58, and as the cover 3 is being closed, the case-side shaft 61 is shifted relatively upward along the main guide portion 58. With this movement, the contact surface 59 is brought closer to the rotatable lever 76, however, the case-side shaft 61 becomes in contact with the convex part 56 before the contact surface 59 becomes in contact with the rotatable lever 76. Accordingly, the actuator 52 is rotated about the cover-side shaft 51 by the effect of the contact in the counterclockwise direction in FIG. 2, and the contact surface 59 is shifted forward (i.e., to the right-hand side of FIG. 2).

In other words, as the contact surface 59 is shifted downward along with the cover 3 being closed, the contact surface 59 is transitorily shifted forward so that the contact surface 59 is suspended from continuously descending to be in contact with the rotatable lever 76.

As the cover 3 is brought closer to the fully-closed position, and the opened extent becomes smaller than the predetermined extent, the case-side shaft 61 is further shifted upward with respect to the guide hole 53 so that the case-side shaft 61 is located above the release portion 54, and the actuator 52 returns to an original position (i.e., the position in which the actuator was before the rotation. Accordingly, the contact surface 59 is shifted backward (the left-hand side of FIG. 2) to become in contact with the rotatable lever 76. As the rotatable lever 76 is pressed by the contact surface 59, the rotatable lever 76 is shifted to a position in the on-state range α, and thereby the cover 3 being in the closed position is detected.

Next, state transition of the cover open/close sensor 41 as the cover 3 is continuously opened will be described in detail. For a comparative purpose, state transition of the conventional facsimile machine 100 will be described referring to FIGS. 5A-5C. FIGS. 5A-5C are schematic diagrams showing a conventional mechanism of the cover open/close sensor 141. In FIG. 5A, the cover 203 is opened at an angle of 1 degree. In FIG. 5B, the cover 203 is opened at an angle of 3 degrees, and in FIG. 5C, the cover 203 is opened at an angle of 5 degrees.

In the conventional facsimile machine 100, as the cover 203 is opened from the fully-closed position to the positions at 1 degree, 3 degrees, and 5 degrees continuously, the position of the rotatable lever 176 is not substantially changed and remains in the on-state range α.

Thus, the cover open/close sensor 41 is not turned off when the cover 203 is opened merely at five degrees. In other words, as the cover 203 in an open position wherein the open state of the cover 203 is detected by the cover open/close sensor 141 is closed, the cover open/close sensor 141 is turned on even when the cover 203 is still open at 5 degrees or more, and the cover 203 is judged to be closed.

Now, the state transition of the facsimile machine 1 of the present embodiment will be described referring to FIGS. 4A-4C. The FIGS. 4A-4C are schematic diagrams showing a mechanism of the cover open/close sensor 41 according to the embodiment of the present invention. As shown in FIG. 4A, the cover open/close sensor 41 remains on when the cover 3 is opened at 1 degree. As the cover 3 is opened at 3 degrees as shown in FIG. 4B, the actuator 52 is rotated by the effect of the contact of the case-side shaft 61 with the convex part 56, and the contact surface 59 is shifted forward (to the right-hand side of FIG. 4B). Accordingly, as the rotatable lever 76 is uplifted above the on-state range α, the cover open/close sensor 41 is turned off. Further, when the cover 3 is opened at 5 degrees, as shown in FIG. 4C, the rotatable lever 76 is positioned in vicinity to the uppermost position thereof.

Figure 6:
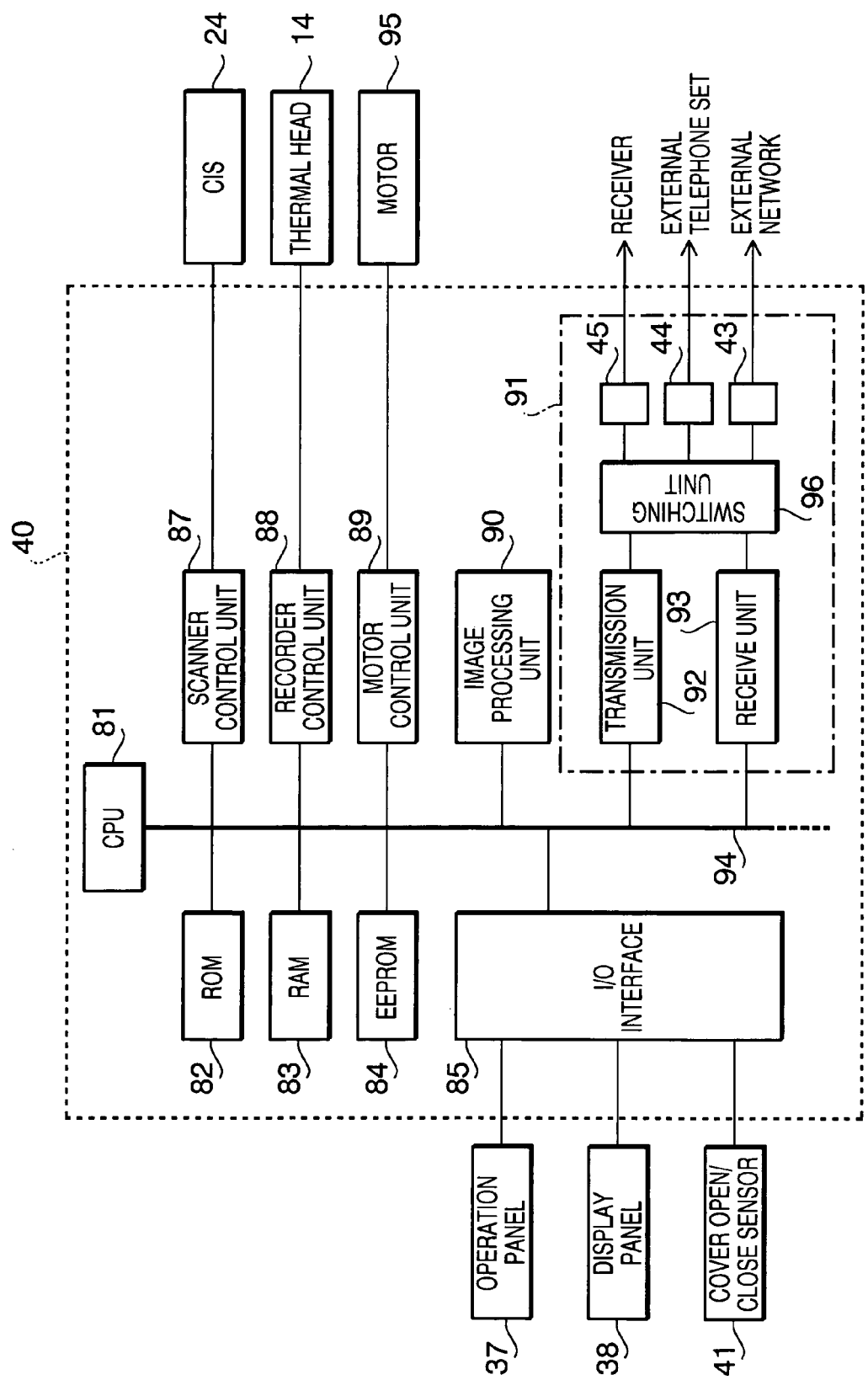
FIG. 6 is a block diagram showing an electrical composition of the facsimile machine according to the embodiment of the present invention.
Figure 7:
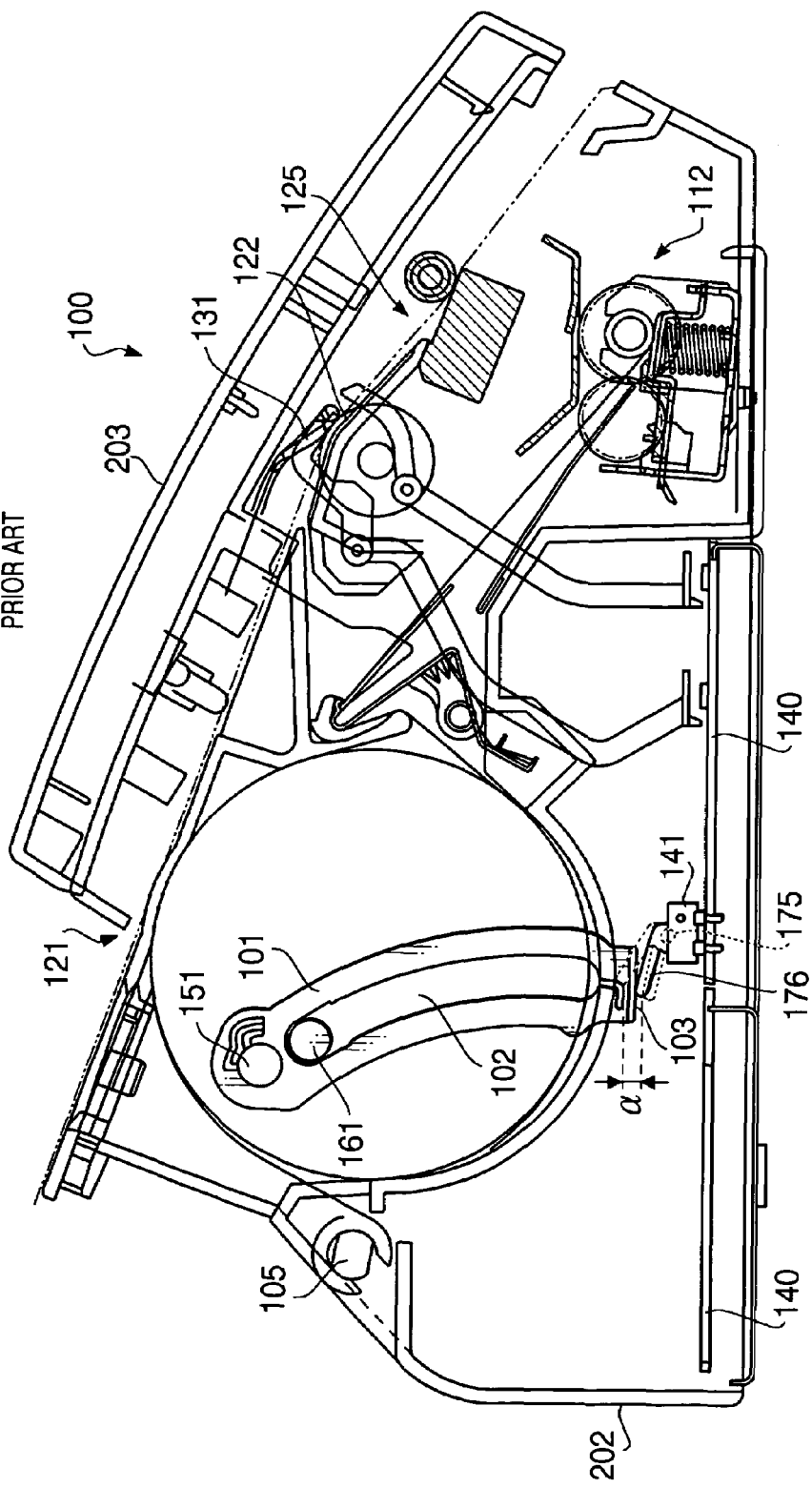
FIG. 7 is a schematic diagram showing a detecting system capable of detecting open/close status of a cover of a conventional facsimile machine.
Figure 8:
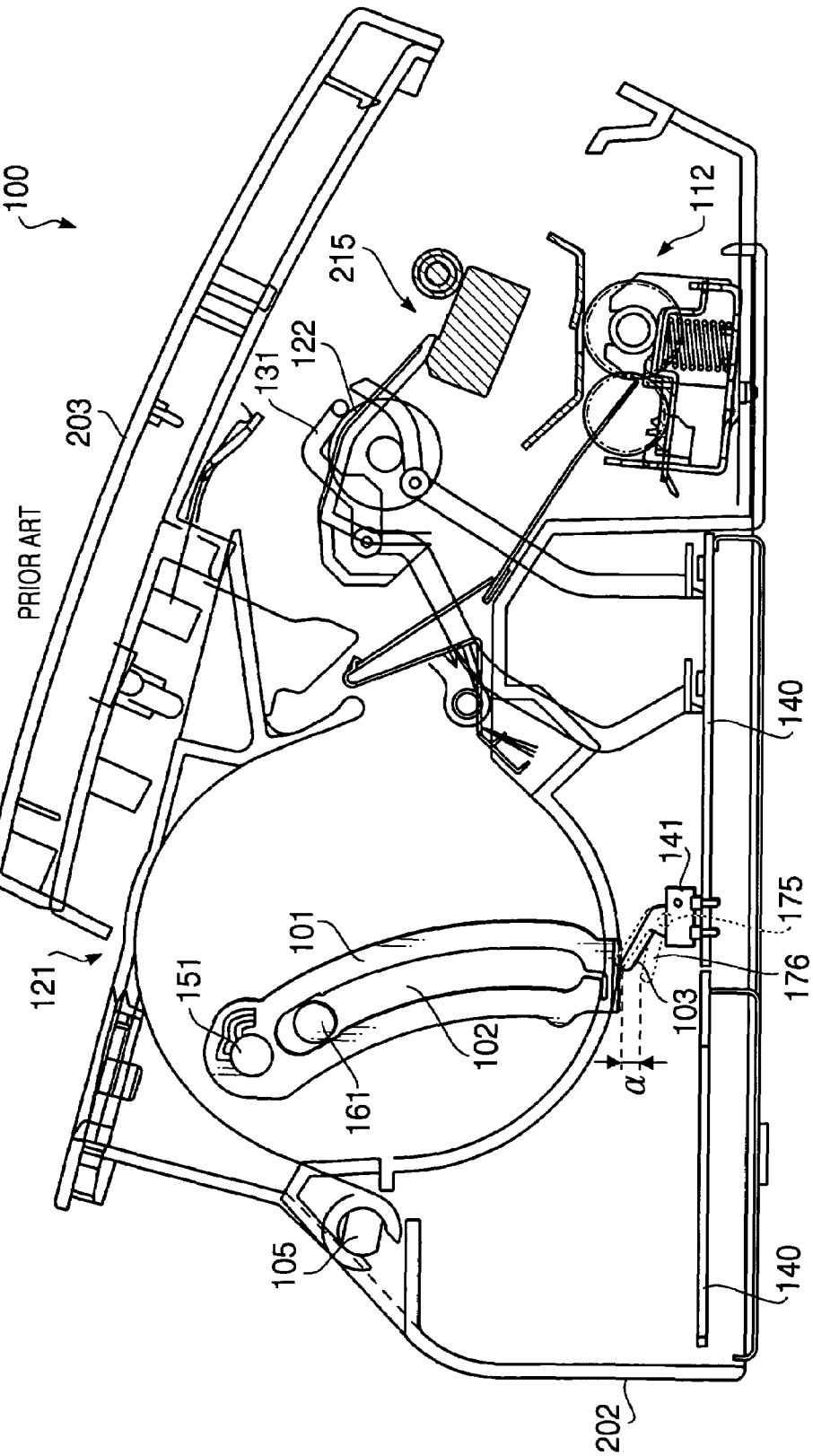
FIG. 8 is another schematic diagram showing the detecting system to the detect open/close status of the cover of the conventional facsimile machine.

Next, referring to FIG. 6, a control circuit of the facsimile machine 1 of the present embodiment will be described. FIG. 6 is a block diagram showing an electrical composition comprising the printed circuit board 40 of the facsimile machine 1 that controls various operations of the facsimile machine 1 according to the embodiment of the present invention.

As shown in FIG. 6, the facsimile machine 1 comprises a CPU 81, a ROM 82, a RAM 83, an EEPROM 84, an I/O (input/output) interface unit 85, a scanner control unit 87, an image-recording control unit 88, a motor control unit 89, an image processing unit 90, a communication interface unit 91, which are interconnected by an internal bus 94. The CPU 81 controls overall operations of the facsimile machine 1. The ROM 82 therein stores various controlling programs to be executed by the CPU 81. The RAM 83 is used as a work area for computations. The EEPROM 84 stores therein programs and parameters to be used by the CPU 81. The I/O interface unit 85 is used to output various information to a display panel 38 so that images according to the various information are shown and to input operations from an operation panel 37 and information regarding on/off status of the cover open/close sensor 41 to the CPU 81. The scanner control unit 87 controls scanning operations of the CIS 24 to scan the original document. The image-recording control unit 88 controls image recording operations of the thermal head 14. The motor control unit 89 controls rotation of a motor 95. The image processing unit 90 processes image data obtained by scanning the original document and image data for an image to be formed on the recording paper 7. The communication interface unit 91 processes transmitting operations to transmit the image obtained by scanning the original document to an external network (a public network, for example) and receiving operations to receive images and audio data sent from the external network. The above-described units are configured on the printed circuit board 40.

The communication interface unit 91, more specifically, comprises a transmission unit 92, which transmits various data, a receive unit 93, which receives audio data and image data, and a switching unit 96. The communication interface unit 91 further comprises a connecting terminal 43, an external telephone terminal 44, and a receiver connecting terminal 45, and the connecting terminal 43 is connected to the external network via a connecting code (not shown) inserted into the connecting terminal 43. The external telephone terminal 44 is connected to an external telephone set (not shown) via a telephone code (not shown) when the external telephone set is used. The receiver connecting terminal 45 is connected to a receiver (not shown) via a receiver code (not shown).

The switching unit 96 switches connections between the connecting terminal 43, the external telephone terminal 44, and the receiver connecting terminal 45. Further, connections of the connecting terminal 43 with the transmission unit 92 and the receive unit 93 is switched by the switching unit 96. More specifically, the connecting terminal 43 and the receiver connecting terminal 45 are interconnected when a telephone (voice) call is via the receiver equipped to the facsimile machine 1 made. When a telephone (voice) call is made via the external telephone set, which is connected to the facsimile machine 1, the connecting terminal 43 and the external telephone terminal 44 are interconnected. When the image data obtained by the scanner unit 25 is transmitted to the external network, the image data is transmitted from the transmission unit via the connecting terminal 43. When image data is transmitted to the facsimile machine 1, the image data is inputted to the receive unit 93 via the connecting terminal 43.

With the configuration described above, when the image data is received by the communication interface unit 91 via the external network, the image processing unit 90 executes a necessary step to process the image data according to an instruction from the CPU 81. Thus, an image based on the processed image data is formed on the recording paper 7 by the thermal head 14 under control of the image-recording control unit 88. Simultaneously, the motor control unit 89 controls the rotation of the motor 95 based on an instruction from the CPU 81 to rotate the recording-side platen roller 13.

When an image recorded on the original document is transmitted externally, the CIS 24 under control of the scanner control unit 87 reads the image and image data corresponding to the image is obtained. The image data is thereafter processed by the image processing unit 90 if necessary and transmitted to the external network via the transmission unit 92.

According to the facsimile machine 1 described above, when the cover 3 is opened to a predetermined extent, the actuator 52 is rotated, and the contact surface 59 of the actuator 52 is shifted forward, so that the rotatable lever 76 of the cover open/close sensor 41 is uplifted (recovers) to a position above the on-state range α. Therefore, as the predetermined extent of the cover 3 to be opened is adjusted, the open state of the cover 3 can be detected when the cover 3 is opened merely at a small extent.

In other words, as the cover 3 is closed, the contact surface 59 is restrained from pressing the rotatable lever 76 so that the rotatable lever 76 remains above the on-state range α until the cover 3 is substantially closed. When the cover 3 comes in a position wherein the opening is a substantially small extent (i.e., when the cover 3 is opened to less extent than the predetermined extent), the actuator 52 is released from the rotating force caused by the effect of the contact of the case-side shaft 61 with the convex part 56, and the contact surface 59 presses the rotatable lever 76 to a position in the on-state range α. Thus, the cover 3 being incompletely closed can be prevented from being erroneously determined to be open by the cover open/close sensor 41.

Further, according to the above configuration, the rotation of the actuator 52 can be achieved to shift the contact surface 59 forward by having the release portion 54 (i.e., the convex part 56 and the concave part 55) in the guide hole 53 of the actuator 52. Thus, the facsimile machine 1 capable of reliably detecting the open/close status of the cover 3 can be cost-effectively achieved in a less complicated manner.

In the facsimile machine 1 of the present embodiment, as the cover 3 is opened to the predetermined extent, the contact surface 59 is shifted forward (i.e., in a horizontal direction of the facsimile machine 1, which is approximately perpendicular to the open/close direction of the cover 3). Therefore, the rotatable lever 76 in the on-state range α being pressed by the contact surface 59 can be released from the pressing force in a faster manner, so that the cover 3 being open at a minor extent can be reliably detected.

Thus, according to the configuration of the detecting system 250 described above, variations occurring due to various factors such as dimension errors and the like among a plurality of the facsimile machines 1 of a product line can be compensated.

Although examples of carrying out the invention have been described, those skilled in the art will appreciate that there are numerous variations and permutations of the detecting system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the cover open/close sensor 41 may be replaced with one of various detecting systems, such as a photo interrupter, which can be turned on and off based on a position of a part of the facsimile device (in the above-described embodiment, the actuator 52) being shifted according to opening/closing motion of the cover, having a predetermined on-state range.

For another example, a device to which the present invention is applied may not necessarily employ the thermal head 14 to record the image on the thermo-sensitive recording paper 7, as long as the device is configured to detect the open/close status of the cover that is openable and closable to a body of the device.

What is claimed is:

1. A detecting system capable of detecting an open/closed state of a cover equipped to a body of a device comprising:
    a body;
    a cover that is openable and closable to the body by moving in a range between an open position and a fully-closed position;
    a detecting unit that is equipped to the body and detects open state and closed state of the cover;
    an actuating mechanism that is equipped to the cover and a part of which is shifted in a first direction to affect the detecting unit according to an opening motion and a closing motion of the cover, and affects the detecting unit so that the closed state of the cover is detected by the detecting unit when the detecting unit is interfered with by the actuating mechanism in a predetermined extent; and
    a releasing mechanism by which the part of the actuating mechanism is shifted in a second direction, in which the detecting unit is released from an interfering effect caused by interference with the actuating mechanism when the cover in the open position is brought in to a position adjacent to the fully-closed position and when the cover in the fully-closed position is opened to a predetermined extent to the position adjacent to the fully-closed position.

2. The detecting system according to claim 1,
    wherein the actuating mechanism comprises:
    a first shaft that is provided on the cover and is extended perpendicularly with respect to an opening/closing direction of the cover;
    a second shaft that is provided on the body and is extended in parallel with respect to an axis of the first shaft; and
    an actuator comprising a through hole to be penetrated through by the first shaft and a guide hole to be engaged with the second shaft,
    wherein the second shaft is shifted along the guide hole with respect to the actuator according to the opening motion and the closing motion of the cover so that the actuator is shifted in the first direction, and
    wherein the releasing mechanism is configured to shift at least an actuating portion of the actuator in the second direction when the cover in the fully-closed position is opened to the predetermined extent.

3. The detecting system according to claim 2,
    wherein the guide hole comprises a guide portion in which the actuator is shifted in the open/close direction of the cover according to the opening motion and the closing motion of the cover, and
    wherein the releasing mechanism comprises a releasing portion, which is provided in a portion being in a direction wherein the second shaft is relatively shifted according to the opening motion of the cover, adjacent to a position wherein the second shaft is located when the cover is in the fully-closed position, so that the actuating portion is shifted in the second direction by an effect of the second shaft that occurs when the cover is opened to the predetermined extent.

4. The detecting system according to claim 3,
    wherein the detecting unit comprises a pressed portion, which is pressed by the actuator in the first direction, and a sensor unit, which detects the closed state of the cover when the pressed portion is shifted for a predetermined sensing amount by the actuating mechanism, and
    wherein the pressed portion being pressed by the actuator is released from the effect of the actuator within a less amount to be pressed than the predetermined sensing amount in which the pressed portion is released from an effect of an actuating mechanism having no releasing mechanism as the cover in the fully-closed position is opened.

5. The detecting system according to claim 2,
wherein the detecting unit comprises a pressed portion, which is pressed by the actuator in the first direction, and a sensor unit, which detects the closed state of the cover when the pressed portion is shifted for a predetermined sensing amount by the actuating mechanism, and
wherein the pressed portion being pressed by the actuator is released from the effect of the actuator within a less amount to be pressed than the predetermined sensing amount in which the pressed portion is released from an effect of an actuating mechanism having no releasing mechanism as the cover in the fully-closed position is opened.

6. The detecting system according to claim 2,
wherein the releasing mechanism shifts the actuator in a direction perpendicular to the first direction whilst the cover in the fully-closed position is opened to the predetermined extent.

7. An image processing apparatus comprising:
a detecting system comprising a body, a cover that is openable and closable to the body by moving in a range between an open position and a fully-closed position, a detecting unit that is equipped in the body and detects one of an open state and a closed state of the cover, an actuating mechanism that is equipped to the cover and a part of which is shifted in a first direction to affect the detecting unit according on an opening motion and a closing motion of the cover, and affects the detecting unit so that the closed state of the cover is detected by the detecting unit when the detecting unit is interfered with by the actuating mechanism in a predetermined extent, and a releasing mechanism by which the part of the actuating mechanism is shifted in a second direction, in which the detecting system is released from an interfering effect caused by interference with the actuating mechanism when the cover in the open position is brought into a position adjacent to the fully-closed position and when the cover in the fully-closed position is opened to a predetermined extent to remove the position remove adjacent to the fully-closed position;
a scanning unit to scan an image of an original document;
an output unit to output a content of the image scanned by the scanning unit to an external environment;
an input unit to input an image data from the external environment; and
an image recording unit to record an image based on the image data inputted by the input unit on a recording medium,
wherein the scanning unit, the output unit, the input unit, and the image recording unit are stored in the body.

8. An imaging apparatus comprising;
a body,
a cover that is openable and closable to the body by moving in a range between an open position and a fully-closed position; and
a detecting system capable of detecting an open/closed state of the cover, comprising a detecting unit that is equipped in the body and detects an open state and a closed state of the cover, an actuating mechanism that is equipped on the cover and a part of which is shifted in a first direction to affect the detecting unit according to opening motion and closing motion of the cover, and affects the detecting unit so that the closed state of the cover is detected by the detecting unit when the detecting unit is interfered with by the actuating mechanism in a predetermined extent, and a releasing mechanism by which the part of the actuating mechanism is shifted in a second direction, in which the detecting system is released from an interfering effect caused by interference with the actuating mechanism when the cover in the open position is brought into a position adjacent to the fully-closed position and when the cover in the fully-closed position is opened to a predetermined extent to be in the position adjacent to the fully-closed position.

* * * * *